March 6, 1962 G. H. BARRY ETAL 3,024,444

ERROR DETECTION BY SHIFT REGISTER PARITY SYSTEM

Filed Dec. 15, 1958 6 Sheets-Sheet 1

INVENTORS
MELVIN L. DOELZ
GEORGE H. BARRY
BY Moody and Goldman
ATTORNEYS

March 6, 1962 G. H. BARRY ETAL 3,024,444

ERROR DETECTION BY SHIFT REGISTER PARITY SYSTEM

Filed Dec. 15, 1958 6 Sheets-Sheet 2

INVENTORS
MELVIN L. DOELZ
GEORGE H. BARRY
BY Moody and Goldman
ATTORNEYS

March 6, 1962 G. H. BARRY ETAL 3,024,444

ERROR DETECTION BY SHIFT REGISTER PARITY SYSTEM

Filed Dec. 15, 1958 6 Sheets-Sheet 3

INVENTORS
MELVIN L. DOELZ
GEORGE H. BARRY
BY Moody and Goldman
ATTORNEYS

ERROR DETECTION BY SHIFT REGISTER PARITY SYSTEM

Filed Dec. 15, 1958

INVENTORS
MELVIN L. DOELZ
GEORGE H. BARRY
BY Moody and Goldman
ATTORNEYS

INVENTORS
MELVIN L. DOELZ
GEORGE H. BARRY
BY Moody and Goldman
ATTORNEYS

INVENTORS
MELVIN L. DOELZ
GEORGE H. BARRY
BY Moody and Goldman
ATTORNEYS

United States Patent Office 3,024,444
Patented Mar. 6, 1962

3,024,444
ERROR DETECTION BY SHIFT REGISTER PARITY SYSTEM

George H. Barry, North Hollywood, and Melvin L. Doelz, Northridge, Calif., assignors to Collins Radio Company, Cedar Rapids, Iowa, a corporation of Iowa Filed Dec. 15, 1958, Ser. No. 780,418
13 Claims. (Cl. 340—147)

This invention relates to means for determining the existence of error in received multiplexed binary data. Binary data is encoded in two states that can be arbitrarily designated as "1" and "0." The transmission of data in binary form is well accepted, and many binary modulation and demodulation techniques are known for communicating such data.

Errors are generally unavoidable in the transmission of any data; and binary coding obtains a minimum error rate, which for example may be a small fraction of one percent of the transmitted data. Nevertheless, such small error rates are intolerable with many communication systems, and errors must be reduced or corrected to the point where communication is virtually without any error. Hence, some type of redundant data (additional to the basic data being communicated) must be provided to enable checking the basic data upon reception, so that the existence of an error can become known. Once an error becomes known, its correction can be accomplished, such as by having the erroneous data retransmitted, or preferably by using the redundant data also for error correction.

The prior art provides several types of error-detection codes intended fo use in the communication of binary data. For example, see 1954 Symposium on Information Theory, Transactions of the I.R.E., PGIT–5, September 1954, pages 38–49 and 50–63.

This invention is related to a type of error detection generally known as parity check. There are two types of parity check systems generally used because of their simplicity. One is sequential, and the other is simultaneous. The sequential parity check provides an extra digit at the end of each code character which adds with the "1's" in the code character to always provide an even number (or an odd number is preferred).

The simultaneous parity check requires an extra channel, and each of its bits adds with the "1's" being simultaneously transmitted by other channels to provide an even numbered addition.

A "checking unit" may be defined as that group of information bits and a parity-check bit which sum to an even number (or odd number). The information bits within a "checking unit" need not be part of the same code.

Each type of parity check suffers from liabilities which enable certain types of errors to pass undetected. Thus, errors occurring in pairs within a "checking unit" are not detected because the summation remains even.

The sequential and simultaneous parity checks are sometimes used together to alleviate some of their individual difficulties. Error detection is then improved to the extent that the two systems are complementary. Nevertheless, some types of errors pass undetected through the dual system. An example is with phase-pulsed binary communication systems of the type described in Patent No. 2,905,812 titled "High Speed Transmission of Messages" of Melvin L. Doelz and Dean F. Babcock, filed April 18, 1955, and assigned to the same assignee as the present invention. In the phase-pulsed system, binary data is modulated by phase-shifts between adjacent pulses. In such case, an erroneously detected phase for one phase-pulse may cause errors in two detected phase shifts, resulting from phase comparisons with each of the prior and following adjacent phase pulses. Hence errors may occur in a pair of sequential bits of binary information in a given channel and pass undetected through a sequential parity check. Consequently, the sequential parity check is not optimal with phase-pulsed modulation. Furthermore, with the simultaneous parity check, noise can cause simultaneous errors with phase-pulses of a plurality of channels and result in undetected error.

The invention provides a parity check system which does not have the above-stated faults of the sequential and simultaneous checks, yet retain their virtues. The invention does this by time offsetting the bits in any "checking unit." Thus, a pair of sequential errors in any one channel or simultaneously in plural channels can not effect more than one bit in a "checking unit" of the invention.

In general, errors tend to correlate with the closeness of time occurrence of bits in a communication. The invention provides an electronic system that removes the time closeness among bits being summed for a parity check without interfering with their transmission rate. For example, in the invention a "checking unit" may include bits respectively taken from first, second and third channels of information at first, third and fifth bit periods, respectively; and they may be added to a bit in a separate parity channel provided at a seventh bit period to obtain an even numbered addition (or an odd numbered addition, if desired).

Furthermore, the invention can be applied either as a single or plural dimensional entity. As a plural dimensional entity, its reliability can be greater than as a single dimensional entity.

A "checking unit" of the invention may be more specifically referred to as an "offset checking unit." It contains one bit from each of plural data channels and at least one parity check channel, and each bit is contributed at a different time, i.e., offset. The bits may be offset by being adjacently time-spaced by one or more intervening bit-intervals. Since data channels do not carry parity information, their information rates are not retarded by the parity check system of the invention.

The invention accomplishes its parity check system in a relatively simple manner circuit-wise with a shift register that has its bistable sections used as "odd-even" adders simultaneously with their use as storage elements in a shift sequence. The channels of a multiplexed communication are provided to different sections of the shift register through "and" gates connected to an "add" timing source which provides short-duty cycle pulses generally timed with the midportions of the data bits. The shift timing of the register is preferably timed with the ends of data-bits. The amount of time-offset is controlled by the number of intermediate sections of the register provided between sections connected to channels, and any integer number (including zero) of intermediate section may be provided. Thus, if one intermediate shift-register section is provided between adjacent data input sections, there is a spacing of one bit period between offset bits in a "checking unit." With a phase-pulsed type of communication system, one intermediate section between adjacent channel connections is sufficient to interrupt the expected error correlation. In multiplex transmission systems such as on-off systems, where errors are mostly simultaneous rather than occurring in sequential pairs, no intermediate shift-register sections may be provided.

Other objects, features, and advantages of this invention will become apparent to one skilled in the art upon further study of the specification and the accompanying drawings in which.

Figure 7:
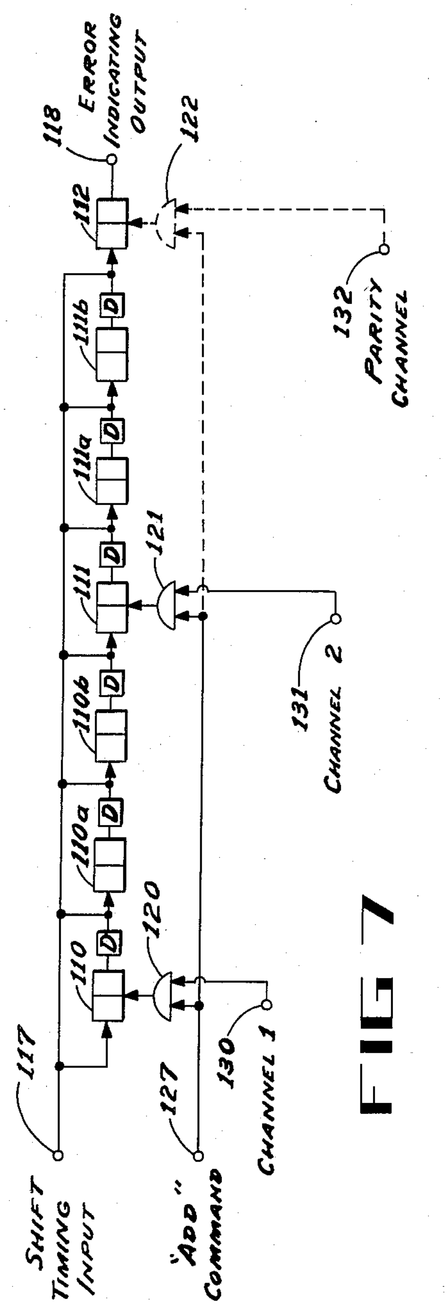
FIGURE 7 shows another version of an encoder/decoder.
Figure 8:
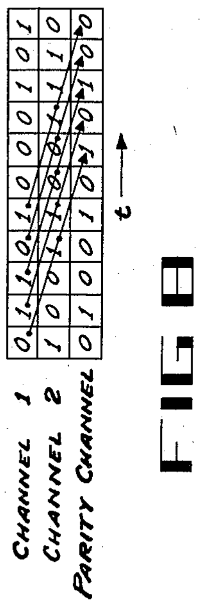
Figure 9:
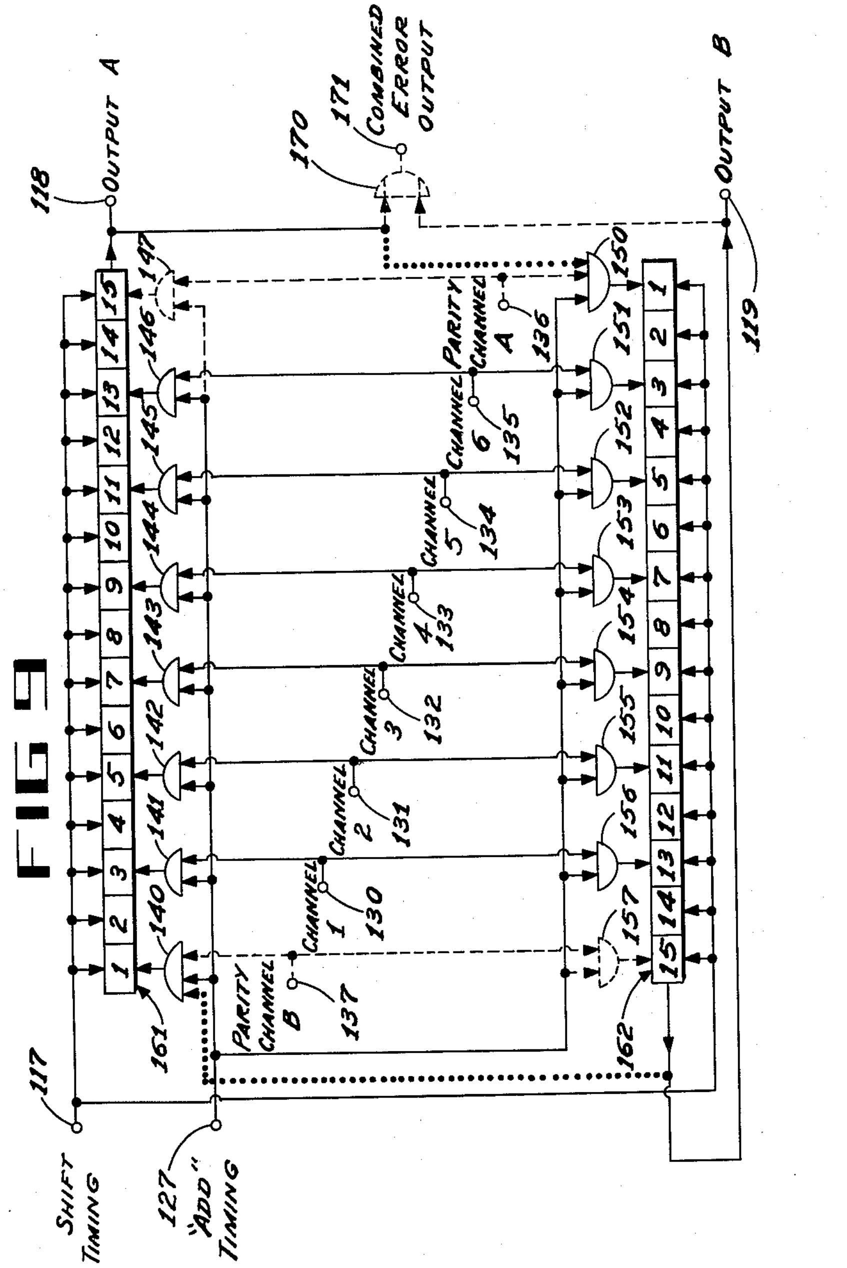

FIGURE 8 provides offset checking units appropriate to FIGURE 7;

FIGURE 9 shows a two-dimensional offset parity check system; and

Figure 10:
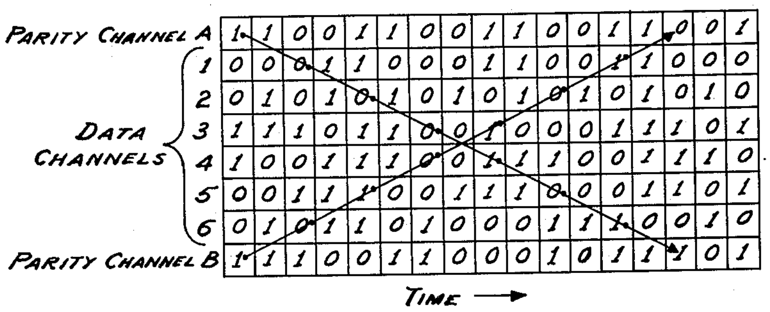

FIGURE 10 illustrates two-dimensional offset sequences appropriate to FIGURE 9.

Figures 1, 2:
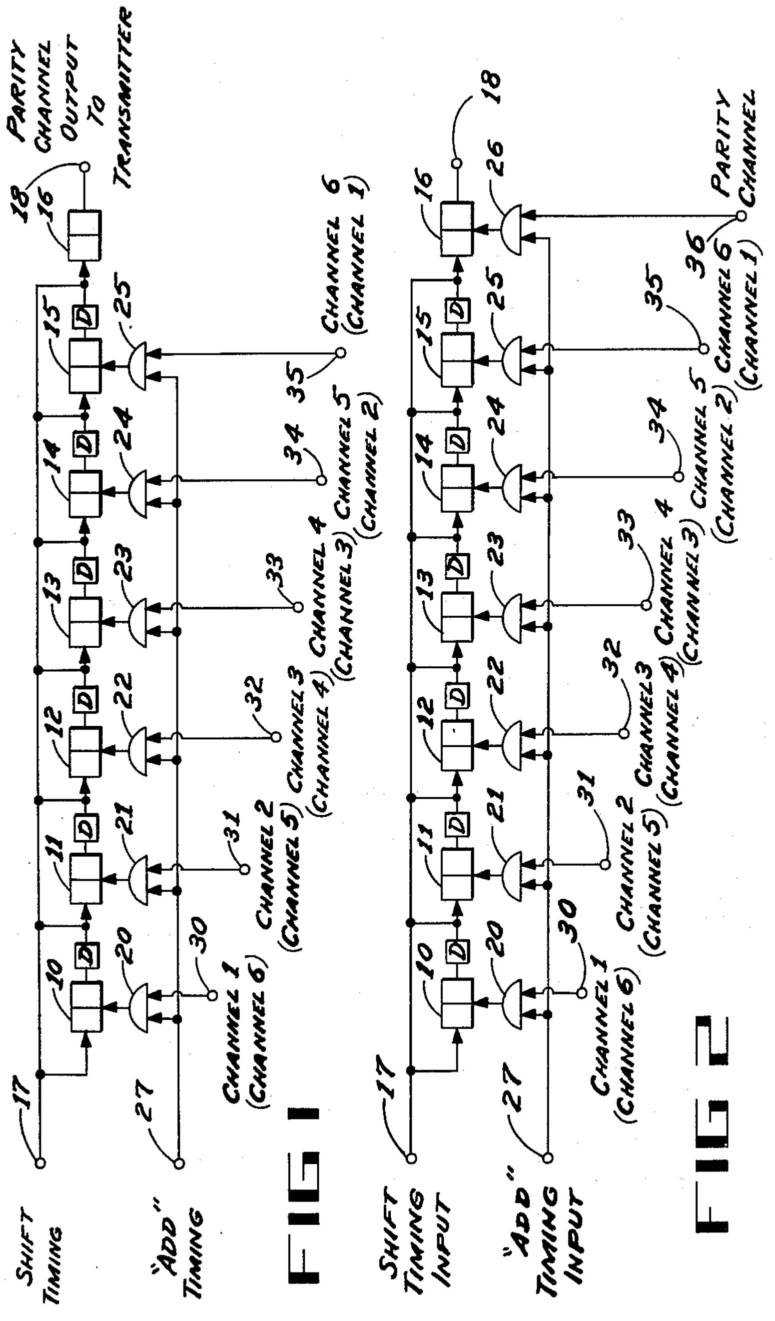
FIGURE 1 illustrates one form of parity check encoder in accordance with the invention.
FIGURE 2 shows a parity check decoder for use with the encoder of FIGURE 1.

Now referring to the drawings for consideration of detailed embodiments of the invention, FIGURE 1 illustrates an offset parity check encoder for use with six channels of multiplexed data. It includes a shift-register having seven sections 10–16 of bistable elements, which for example may be flip-flop circuits, with delay elements D connected between adjacent bistable elements. The shift-register may be of conventional type available commercially. Periodic shifting of the register is caused by a shift-timing source connected to a terminal 17. A terminal 18 receives the output of the register.

Figure 3:
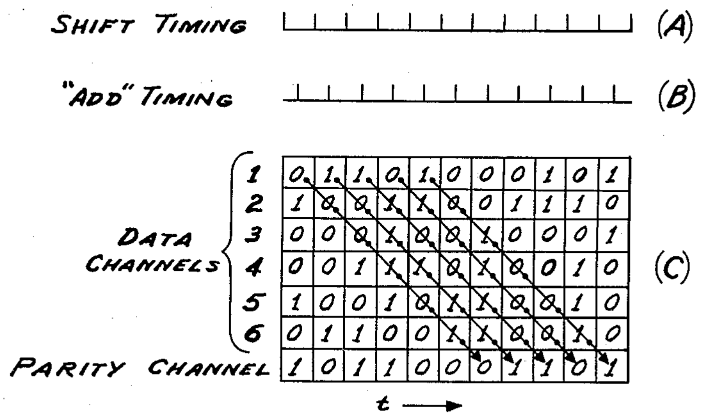
FIGURES 3 and 4 illustrate offset parity check units pertinent to FIGURES 1 and 2.

A plurality of "and" gates 20–25 have outputs connected respectively to bistable sections 10–15. Each "and" gate has an input connected to a terminal 27, which is connected to an "add" timing source that provides short duty-cycle pulses time interleaved with the shift-timing pulses provided at terminal 17. FIGURES 3 (A) and (B) illustrate pulses provided to terminals 17 and 27.

Another input to each "and" gate 20–25 is connected to one of terminals 30–35, which respectively receive data from independent channels 1 through 6.

FIGURE 3 (C) illustrates bit sequences for the parallel channels. Diagonal arrows show the parity check sequencing, and each arrow passes through bits comprising a single "offset checking unit." Each arrow points to a bit provided at encoder output terminal 18, which is the parity-check bit in each "offset checking unit" to obtain an even addition of "1s" in the unit.

Thus, as seen in FIGURES 3 (A), (B) and (C), the "add" timing pulses occur during the midportions of the bits, where sampling is most reliable, and shift-timing pulses occur between the bits.

In any number, it is its lowest digit which controls whether it is odd or even. And with a sequence of numbers, their total can be determined to be odd or even by adding the lowest digits of the numbers in the sequence, and considering only the lowest digit of the total. If the lowest digit is a (0), the total is even in the binary system, and if it is a "1" the total is odd. Addition by a shift register is peculiarly adapted to such determination, because its output is only concerned with the lowest digit of the summed quantity. As the information is shifted along the register, the inputs from the channels are sequentially added to modify the stored data accordingly. The addition is done on a single digit basis with no means for carry. The carries are unimportant when only the lowest digit of the total is important.

At the outputs of each "and" circuit 20–25, a "1" is represented by a pulse and a "0" by no pulse. Accordingly, a shift-register section has its state changed only by a received "1" or by information from its prior section.

The first diagonal arrow on the left in FIGURE 3 (C) may be taken as an illustrative example of the operation of the system in FIGURE 1. Thus, the data-channel bits first provided simultaneously to terminals 30–35 are represented in the first vertical column on the left in FIGURE 3 (C). At the first "add" timing pulse, flip-flops 10–15 register these respective bits. The next shift-timing pulse moves the bits one section toward the output. Thus, the "0" stored in flip-flop 10 moves to flip-flop 11. The next "add" timing pulse injects the next vertical column of data. Hence, the "0" bit of the channel 2

(along the arrow) is injected into flip-flop 11, which retains its zero state. After the next timing pulse, the "0" is shifted to bistable section 12, which receives a "0" from channel 3 (along the arrow); and upon the next "add" timing pulse, it still has zero state. The next shift pulse moves the "0" to flip-flop 13; however, the following "add" timing pulse injects a "1" from channel 4 which resets flip-flop 13 to the "1" state. The following shift-timing pulse moves the "1" to flip-flop 14, followed by another "add" timing pulse which injects a "0" from channel 5 to flip-flop 14, enabling it to retain the "1" setting. The next shift-timing pulse moves the "1" to flip-flop 15, and a "1" injected from channel 6 triggers flip-flop 15 to "0" state. Hence, the next shift pulse moves the zero state to flip-flop 16, wherein it provides a "0" output (at the head of the arrow) at terminal 18 to provide the parity check bit for the first "offset checking unit" represented in FIGURE 3 (C). The output from terminal 18 modulates a parity check channel of a transmitter.

FIGURE 2 illustrates a decoder for a parity check system using the parity information provided from the encoder in FIGURE 1. The decoder in FIGURE 2 is constructed in the same manner as the encoder in FIGURE 1; and like items have the same reference numbers. However, in FIGURE 2, another "and" gate 26 is provided to receive the detected parity channel bits, which are received by one input of the gate. Another input is connected to "add" timing terminal 27; and the output of gate 26 is connected for triggering bistable circuit 16.

The circuitry in FIGURE 2 operated similarly to that in FIGURE 1. The addition of each received "offset checking unit" in FIGURE 2 should provide a "0" at its terminal 18 if all data in each "offset checking unit" has been properly received. Thus, if a "1" is ever provided at terminal 18 in FIGURE 2, a communication error is indicated in the corresponding "offset checking unit." The transmitter can be signalled to retransmit the multiplexed information occurring during the prior seven bit-periods preceding the error indicating "1."

Figure 4:
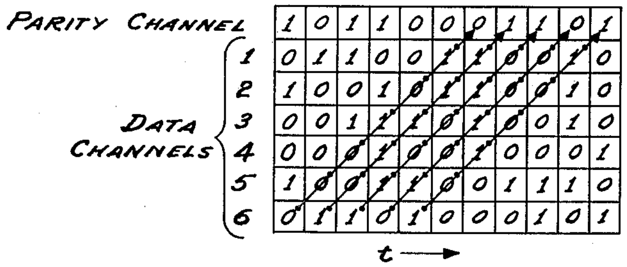

In the system thus far described, a particular order was used for sequencing the channels in each "offset checking unit." In fact, any predetermined order may be used. For example, the channels may be connected in reverse order to terminals 30–35 as given in parentheses in FIGURES 1 and 2. In the reverse case, the diagonal-arrow representations of FIGURE 4 are obtained. It is only required that once a given order be chosen, that it be the same at both the transmitter and receiver.

With some types of modulation, the offset sequence used in FIGURES 1 and 2 is not optimum. Thus, in phase-pulsed systems data errors in a given channel tend to occur in sequential and simultaneous pairs; and there may result errors in adjacently offset bits within "checking units" of the type in FIGURES 3 and 4 to cause pairing of errors. As explained above, such pairing of errors can cause failure of error indication.

Figure 5:
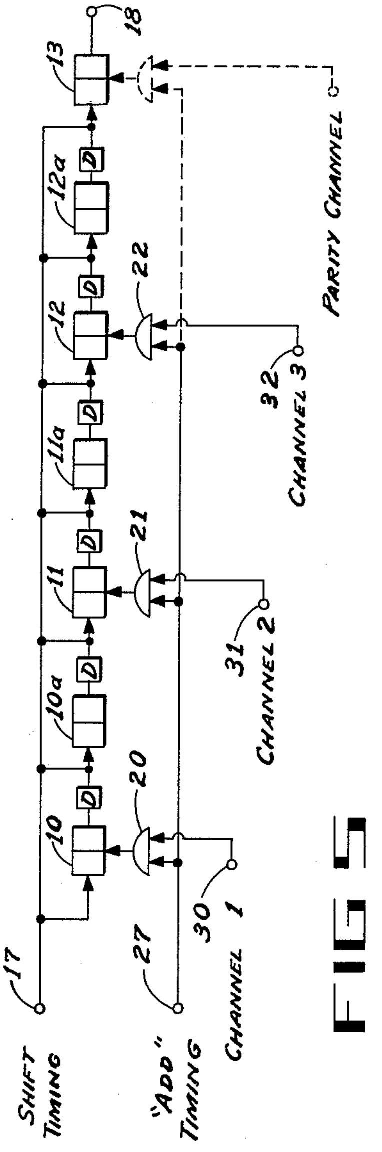
FIGURE 5 shows simultaneously a parity check encoder and decoder devised according to the invention.
Figure 6:
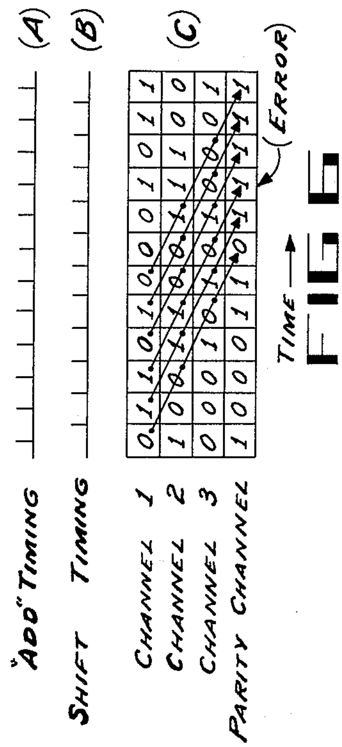
FIGURE 6 illustrates offset parity check units pertinent to FIGURE 5.

To avoid any significant probability of such error pairing in an "offset checking unit," at least a single bit-period spacing between the bits in an "offset checking unit" is advisable. FIGURE 5 illustrates both an encoder or decoder of parity check information having a skipped bit-period between bits in each "offset checking unit." It is an encoder when ignoring the portions represented by dashed lines, and it is a decoder when using those portions. Examples of the one-skip "checking units" are illustrated by the bits crossed by respective arrows in FIGURE 6 (C). The only basic structural distinction between the one-skip system of FIGURE 5 and the no-skip system of FIGURE 1 is that an intermediate shift-register section is provided between shift-register sections connected to "and" gates. Three data channels are accommodated in FIGURE 5, and intermediate shift-register sections 10a, 11a, and 12a are respectively provided after sections 10, 11, and 12. It is therefore apparent that any number of data channels can be accommodated.

The same shift timing and "add" timing inputs 17 and 27 are provided in FIGURE 5 as were provided in FIGURE 1.

In fact, any number of bit-periods may be skipped between adjacent bits in a "offset parity-checking unit"; and the number of skipped periods is equal to the number of bistable shift-register sections intermediate to adjacent sections directly receiving channel data.

Accordingly, FIGURE 8 illustrates two-skip "offset checking units." That is, two bit-periods are skipped between the bits in each "offset parity-checking unit" represented by an arrow. FIGURE 7 illustrates an encoding/decoding system for the two-skip parity checking sequencing in FIGURE 8. By eliminating the dashed line portions, the illustrated system is converted from a decoder to an encoder. Otherwise the operation of the system in FIGURE 7 is like the previously described systems.

FIGURE 10 illustrates a two-dimensional type of offset parity check; wherein "offset parity-checking units" of the one-skip type are used. The two-dimensional system is basically two overlapping one-dimensional systems. FIGURE 9 shows an embodiment of a two-dimensional system, which also includes in each one-dimensional "checking unit" bits from both parity channels. It is noted from FIGURE 10 that the first and last bits with the arrow representation of a "checking unit" are from parity channels A and B.

The two-dimensional system is more immune to error-passing then a one-dimensional system. In the two dimensional system, a pair of errors in a "checking unit" of one dimension can not be common to any "checking unit" of the other dimension. Hence, paired errors that would go undetected in a single dimension system are indicated by a two dimensional system.

FIGURE 9 illustrates a combined arrangement representing an encoder and a decoder. As an encoder, the dotted lines are used, and the dashed lines ignored. On the other hand, as a decoder, the dashed lines are used, ignoring the dotted lines.

In FIGURE 9, two shift-registers 161 and 162 are provided. Each may be similar to the one-skip shift-register arrangement in FIGURE 5, except that more stages are provided in FIGURE 9 to accommodate more channels. Consequently, each shift register in FIGURE 9 has fifteen stages in order to accommodate data channels 1–6 and parity channels A and B on a one-skip basis. The odd numbered sections in each shift register directly receive data. However, the shift-registers are connected oppositely to the channels; the reverse connections provide the two-dimensional check. Hence, the order of channel connections to shift register 161 provides the "offset checking unit" represented by the downward-going diagonal arrow in FIGURE 10; while the reverse order of channel connection to shift register 162 provides the "offset checking unit" represented by the upward-going diagonal arrow. Since each "offset parity-checking unit" includes both parity channels A and B, either dimensional check can give an error indication when an error exists in the opposite parity channel.

As an encoder (considering the dotted lines), the output of each shift-register is provided as a first input to the other shift-register through "and" gate 140 or 150. The encoded parity-channel outputs A and B are provided respectively at terminals 118 and 119.

As a decoder (considering the dashed lines and not the dotted ones), there is no feedback; and instead, the parity data of channels A and B are provided to the first and last sections of register 161, and reversedly to the last and first sections of register 162.

In the decoder, the outputs 118 and 119 of the shift-registers are respectively combined through an "or" circuit 170 to provide a combined output at a terminal 171. Thus, an error is indicated on a two-dimensional basis by a "1" being provided at output terminal 171, since every correct "offset checking unit" should provide a "zero" at the shift-register outputs.

Although this invention has been described with respect to particular embodiments thereof, it is not to be so limited as changes and modifications may be made therein which are within the full intended scope of the invention as defined by the appended claims.

1. A diagonal parity-check system for use with a plurality of simultaneous binary-data channels, comprising a shift-register with a plurality of sections, a shift-timing source of pulses timed with the introduction of binary bits of information simultaneously provided by said channels, a plurality of "and" gates having outputs respectively connected to selected sections of said shift register, each "and" gate having a pair of inputs, an "add" timing source of pulses interleaved with the pulses of said shift-timing source and being connected to one input of each of said "and" gates, the other inputs of said "and" gates being respectively connected to said plurality of data channels, and an output section of said shift-register providing a signal for a parity channel, means for communicating said binary-data channels and said parity channel, means for receiving said data and parity channels, a second shift-register having a second plurality of sections, a second shift-timing input providing pulses timed with the introduction of information bits of said received channels, said second shift-timing source being connected to said second shift register to advance data along it, a plurality of second "and" gates having outputs connected to different sections of said shift-register, each of said second "and" gates having at least a pair of inputs, and a second "add" timing source providing pulses interleaved with pulses from said second shift-timing source, one input of each of said second "and" gates being connected to said second "add" timing source, another input of each of said second "and" gates being connected to a different one of said received channels, with an output of a final section of said second shift register indicating the occurrence of a reception error.

2. A diagonal parity-check generator for use with a plurality of simultaneous binary-data channels comprising, a shift-register with a plurality of sections, a shift-timing source of pulses timed with the introduction of binary bits of information simultaneously provided by said channels connected to said shift register, a plurality of "and" gates having outputs respectively connected to selected sections of said shift register, each "and" gate having a pair of inputs, an "add" timing source of pulses interleaved with the pulses of said shift-timing source and being connected to one input of each of said "and" gates, the other inputs of said "and" gates being respectively connected to said plurality of data channels in any given order, and an output section of said shift register providing a signal for a parity channel.

3. A parity check generator as defined in claim 2 in which the "and" gates are connected to adjacent shift-register sections.

4. A parity-check generator as defined in claim 2 in which at least one intermediate shift-register section is provided between adjacent shift-register sections connected to said "and" gates.

5. A diagonal parity-check indicator for operation with a received parity-check channel and a plurality of received binary data channels comprising, a shift-register having a plurality of sections, a shift-timing input providing pulses timed with the introduction of detected channel information bits, said shift-timing source being connected to said shift register to advance data along it, a plurality of "and" gates having outputs connected to different sections of said shift-register, each "and" gate having at least a pair of inputs, an "add" timing source providing pulses interleaved with pulses from said shift-timing source, one input of each of said "and" gates being connected to said "add" timing source, another input of each of said "and" gates being connected to a different one of said received channels, with an output of a final section of said shift register indicating the occurrence of an error.

6. A parity check system as defined in claim 5 in which the "and" gates are connected to adjacent shift register sections.

7. A parity check generator as defined in claim 5 in which at least one intermediate shift register section is provided between adjacent shift-register sections connected to said "and" gates.

8. A two-dimensional offset parity-check generator for use with a plurality of binary data channels comprising, first and second shift-registers each having a plurality of sections, a first plurality of "and" gates having outputs respectively connected to different sections of said first shift-register, a second plurality of "and" gates having outputs respectively connected to sections of said second shift-register, each of said "and" gates having at least a pair of inputs, an "add" timing source connected to one input of each of said "and" gates, said "add" timing source providing output pulses timed with midportions of binary-information bits of said data channels, a shift-timing source providing pulses interleaved with pulses of said "add" timing source, said shift-timing source being connected to said first and second shift-registers for advancing data along them, said data channels being connected in a given order to the other inputs of the "and" gates connected to said first shift register, said data channels being connected in reverse order to the other inputs of the "and" gates connected to said second shift register, said given order and said reverse order being with respect to the direction of data advance for a respective shift-register, and two parity output channels being provided from final sections of said first and second shift registers.

9. A two-dimensional generator as defined in claim 8 having a first feedback "and" gate with an output connected to a section of said first shift register, a second feedback "and" gate with an output connected to a section of said second shift-register, each "and" gate having a pair of inputs, with one input of each "and" gate connected to said "add" timing source, another input of said first feedback "and" gate connected to the output of said second shift-register, and another input of said second feedback "and" gate connected to the output of said first shift-register.

10. A two-dimensional offset parity check indicator for use with a plurality of received binary-data channels and received first and second parity channels comprising, first and second shift-registers each having a plurality of sections, a first plurality of "and" gates having outputs respectively connected to different sections of said first shift-register, a second plurality of "and" gates having outputs respectively connected to sections of said second shift-register, each of said "and" gates having at least a pair of inputs, an "add" timing source connected to one input of each of said "and" gates, said "add" timing source providing output pulses timed with midportions of bits of said channels, a shift-timing source providing pulses interleaved with pulses of said "add" timing source, said shift-timing source being connected to said first and second shift-registers for advancing data along them, said data channels and said first parity channel being connected in a given order to the other inputs of the "and" gates connected to said first shift-register, said data channels and said second parity channel being connected in reverse order to the other inputs of the "and" gates connected to said second shift-register, said given order and reverse order being with respect to the direction of data advance for each shift-register, and the outputs of said first and second shift-registers indicating the occurrence of an error.

11. A two-dimensional indicator as defined in claim 10 having another pair of "and" gates with outputs connected oppositely to sections of said first and second shift-registers, each "and" gate having a pair of inputs, with an input connected to said "add" timing source, the other input of each said pair of "and" gates being connected to one of said parity channels so that each shift-register receives both parity channels but in reverse order.

12. An indicator as defined in claim 11 in which first and last "and" gates with respect to each order of connection to the first and second shift-registers are connected in reverse order to the received parity-channels and an "or" gate receives the output of each shift-register, and an output of the "or" gate indicating the occurrence of an error.

13. A two-dimensional offset parity check system for use with a plurality of simultaneous binary-data channels comprising first and second shift-registers each having a plurality of sections, a first plurality of "and" gates having outputs respectively connected to different sections of said first shift-register, a second plurality of "and" gates having outputs respectively connected to sections of said second shift-register, each of said "and" gates having at least a pair of inputs, an "add" timing source connected to one input of each of said "and" gates, said "add" timing source providing output pulses timed with midportions of binary-information bits of said data channels, a shift-timing source providing pulses interleaved with pulses of said "add" timing source, said shift-timing source being connected to said first and second shift-registers for advancing data along them, said data channels being connected in a given order to the other inputs of the "and" gates connected to said first shift-register, said data channels being connected in reverse order to the other inputs of the "and" gates connected to said second shift-register, said given order and said reverse order being with respect to the direction of data advance for a respective shift-register, and two parity output channels being provided from final sections of said first and second shift registers, means for communicating said binary data channels and said parity channels, means for receiving said data and parity channels, third and fourth shift registers provided with said receiving means and each having a plurality of sections, a third plurality of "and" gates having outputs respectively connected to different sections of said third shift-register, a fourth plurality of "and" gates having outputs respectively connected to sections of said fourth shift-register, each of said "and" gates having at least a pair of inputs, an "add" timing source at said receiving means connected to one input of each of said "and" gates, said "add" timing source providing output pulses timed with midportions of bits of said channels, a shift-timing source at said receiving means providing pulses interleaved with pulses of said "add" timing source, said shift-timing source being connected to said third and fourth shift-registers for advancing data along them, said data channels and said third parity channel being connected in a given order to the other inputs of the "and" gates connected to said third shift-register, said data channels and said fourth parity channel being connected in reverse order to the other inputs of the "and" gates connected to said fourth shift register, said given order and reverse order being with respect to the direction of data advance for each shift-register, and the outputs of said third and fourth shift-registers indicating the occurrence of an error.

References Cited in the file of this patent

UNITED STATES PATENTS

| | | |
|---|---|---|
| 2,695,397 | Anderson | Nov. 23, 1954 |
| 2,740,106 | Phelps | Mar. 27, 1956 |
| 2,853,697 | Silliman | Sept. 23, 1958 |
| 2,884,625 | Kippenhan | Apr. 28, 1959 |
| 2,889,534 | Lubkin | June 2, 1959 |
| 2,894,684 | Mettleton | July 14, 1959 |
| 2,956,124 | Hagelbarger | Oct. 11, 1960 |